(12) United States Patent
Okano et al.

(10) Patent No.: US 8,266,919 B2
(45) Date of Patent: Sep. 18, 2012

(54) TRANSMISSION SYSTEM FOR AIR CONDITIONER

(75) Inventors: Takashi Okano, Osaka (JP); Kouichiro Tamakoshi, Osaka (JP); Hiroshi Doumae, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 102 days.

(21) Appl. No.: 12/373,007

(22) PCT Filed: Jul. 11, 2007

(86) PCT No.: PCT/JP2007/063792
§ 371 (c)(1),
(2), (4) Date: Jan. 8, 2009

(87) PCT Pub. No.: WO2008/007687
PCT Pub. Date: Jan. 17, 2008

(65) Prior Publication Data
US 2009/0151382 A1 Jun. 18, 2009

(30) Foreign Application Priority Data
Jul. 11, 2006 (JP) ................... 2006-190251

(51) Int. Cl.
*F25B 7/00* (2006.01)
*F25D 19/00* (2006.01)
*F25D 25/00* (2006.01)
*G05D 23/00* (2006.01)

(52) U.S. Cl. .............. 62/175; 62/298; 62/377; 700/276; 700/277

(58) Field of Classification Search .................... 62/298, 62/377, 175, 132; 236/51; 700/276–277
See application file for complete search history.

(56) References Cited

U.S. PATENT DOCUMENTS

| | | | | | |
|---|---|---|---|---|---|
| 4,710,645 | A | * | 12/1987 | Doittau et al. | 307/115 |
| 5,853,123 | A | * | 12/1998 | Okano et al. | 236/51 |
| 6,249,512 | B1 | * | 6/2001 | Shiobara | 370/235 |
| 2002/0018724 | A1 | * | 2/2002 | Millet et al. | 417/228 |
| 2005/0005619 | A1 | * | 1/2005 | Kojima et al. | 62/132 |
| 2005/0025162 | A1 | * | 2/2005 | Binder | 370/401 |
| 2009/0151382 | A1 | | 6/2009 | Okano et al. | |

FOREIGN PATENT DOCUMENTS

| | | |
|---|---|---|
| EP | 1 798 494 A1 | 6/2007 |
| JP | 5-175965 A | 7/1993 |
| JP | 8-94154 A | 4/1996 |
| JP | 9-80085 A | 3/1997 |

(Continued)

OTHER PUBLICATIONS

Clark et al., Cisco LAN Switching (CCIE Professional Development), Aug. 26, 1999, Cisco Press, pp. 125-126.*

(Continued)

*Primary Examiner* — Frantz Jules
*Assistant Examiner* — Cassey D Bauer
(74) *Attorney, Agent, or Firm* — Birch, Stewart, Kolasch & Birch, LLP (57) ABSTRACT

A plurality of air conditioning units (20, 20) are daisy-chain connected to each other by a switching hub (31) provided in an outdoor unit (30). An integrated transmission line (10A) and internal/external transmission lines (10B) are connected to each other by a gateway (32) connected to the switching hub (31) so as to be capable of separating data transmission.

7 Claims, 6 Drawing Sheets

FOREIGN PATENT DOCUMENTS

| | | |
|---|---|---|
| JP | 10-227511 A | 8/1998 |
| JP | 2000-28181 A | 1/2000 |
| JP | 3206476 B2 | 7/2001 |
| JP | 2004-96460 A | 3/2004 |
| JP | 2004-353888 A | 12/2004 |
| JP | 2004-356754 A | 12/2004 |
| JP | 2006-50222 A | 2/2006 |
| JP | 2008-20092 A | 1/2008 |

OTHER PUBLICATIONS

Tapley et al., EshBach's Handbook of Engineering Fundamentals, 1990, John Wiley and Sons, 4th Edition, pp. 9.24.*

* cited by examiner

TRANSMISSION SYSTEM FOR AIR CONDITIONER

TECHNICAL FIELD

The present invention relates to a transmission system of an air conditioner for centralized control on a plurality of air conditioning units.

BACKGROUND ART

As a transmission system for a multi air conditioner for building use, a device is conventionally known in which a plurality of air conditioning units each are so composed that one outdoor unit is connected to a plurality of indoor units through an internal/external transmission line while each outdoor unit of the plurality of air conditioning units is connected to a centralized control unit through an integrated transmission line (see Patent Document 1, for example).

In the transmission system in Patent Document 1, the centralized control unit and the outdoor units are bus-connected to each other through the integrated transmission line. When the integrated transmission line and communication lines for the indoor units use the same protocol, the number of communication interfaces can be reduced to one. The integrated transmission line and the communication lines for the indoor units are connected to each other via a relay or the like inside each outdoor units, and accordingly, the indoor units can be regarded to be bus-connected to the communication lines branching from the integrated transmission line when viewed from the integrated transmission line.

Patent Document 1: Japanese Patent No. 3206476

SUMMARY OF THE INVENTION

Problems that the Invention is to Solve

However, in the conventional transmission system in which the transmission lines branch, the characteristic impedances of the branching transmission lines are discontinuous at each branch point, and therefore, influence of the reflected wave causes distortion of the communication waveform in a large-scale system, thereby inviting communication abnormality.

Figure 6:
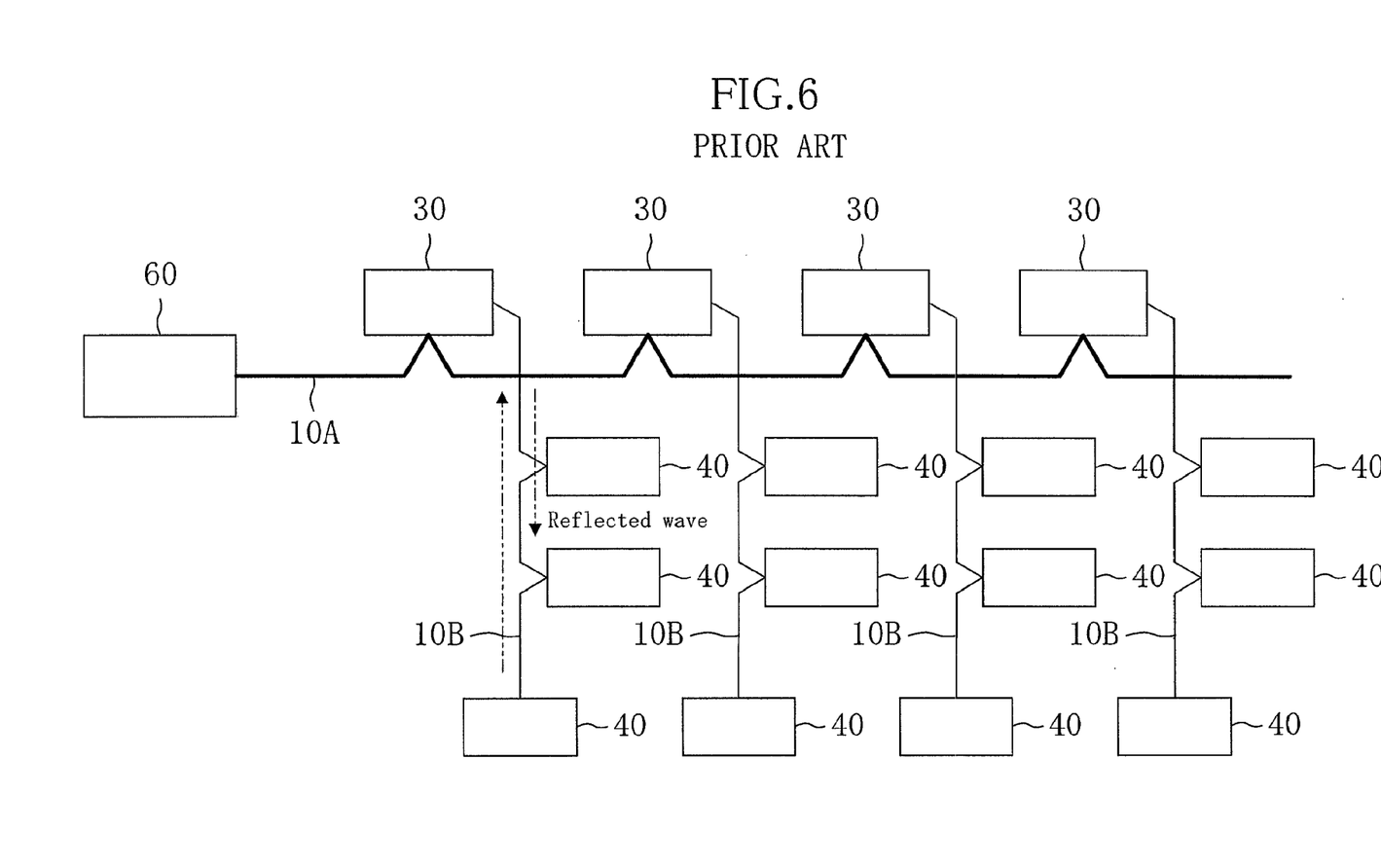
FIG. 6 is a schematic diagram showing a construction of a conventional transmission system for an air conditioner.

Specifically, as shown in FIG. 6, in sending a communication signal from an indoor unit (40), the characteristic impedance of the signal is lowered due to the presence of many branches to generate the negative reflected wave at the time when the signal reaches an integrated transmission line (10A). This causes the communication waveform to be distorted in the other indoor units (40, 40) connected at some point in an internal/external transmission line (10B) to invite communication abnormality.

Since the data transmission path of the air conditioner is built in a single bus line, a failure (short-circuit in the transmission path, noise induction, for example) at one given point in the transmission path, if occurs, may involve adverse influence on the entire system. Further, since all communication data transmitted from the integrated transmission line (10A) and the internal/external transmission lines (10B) flow through the integrated transmission line (10A), communication traffic may increase. As a result, the number of connectable units may be limited, and expansion of communication data may become difficult.

Since transmission wires for the transmission lines are connected to a terminal board in the conventional transmission system (10), connection of a communication terminal to a power supply in error at an installation site may break all control boards of the units connected through the same bus line. In addition, the transmission wires are connected to the terminal board, which may invite connection thereof to a non-specified power supply to cause communication abnormality. Particularly, it is much difficult to check the state of the transmission wires thereafter once the transmission wires are laid inside a building.

The present invention has been made in view of the foregoing, and its objective is to suppress to the minimum influence of communication abnormality caused at a point in transmission lines on the entire system.

Means for Solving the Problems

To attain the above object, in the present invention, an integrated transmission line (10A) and internal/external transmission lines (10B) are connected to each other indirectly with transmission relay means (25) capable of separating data transmission between the transmission lines (10A, 10B) interposed.

Specifically, a first aspect of the present invention is directed to a transmission system for an air conditioner including: a plurality of air conditioning units (20) in each of which an outdoor unit (30) and a plurality of indoor units (40) are connected to each other through an internal/external transmission line (10B) so as to be capable of data transmission; and an integrated transmission line (10A) connecting a centralized control unit (60) for centralized control on the air conditioning units (20, 20) and each of the air conditioning units (20, 20) so as to be capable of data transmission.

Wherein, each internal/external transmission line (10B) and the integrated transmission line (10A) are connected to the outdoor units (30), and are connected to each other by transmission relay means (25) capable of separating data transmission between the transmission lines (10A, 10B).

In addition, the transmission relay means (25) includes: a switching hub (31) for daisy-chain connecting the integrated transmission line (10A) between the air conditioning units (20, 20); and a gateway (32) connected to the switching hub (31) and being capable of separating data transmission between the transmission lines (10A, 10B).

In the first aspect, the internal/external transmission lines (10B) and the integrated transmission line (10A) are connected to each other by the transmission relay means (25) which is connected to the outdoor unit (30) and which is capable of separating data transmission between the transmission lines (10A, 10B). Accordingly, the integrated transmission line (10) and the internal/external transmission lines (10B) are connected to each other separably, which is advantageous in preventing generation of the negative reflected wave and occurrence of communication abnormality caused due to variation in characteristic impedance. Daisy chain connection of the integrated transmission line (10) can secure wiring easiness of the conventional bus line, and can suppress to the minimum damage by communication abnormality caused at one point in the transmission lines to the entire system.

Specifically, the outdoor units (30), which are generally installed on a roof floor of a building, may get struck by lighting. For example, when the outdoor units (30, 30) are connected to each other through a bus line, a lighting striking at one point of the integrated transmission line (10A) may break the control boards (33) of all of the bus-connected outdoor units (30). In contrast, the daisy chain connection between the outdoor units (30, 30) prevents influence of a failure, such as short-circuit, ground fault, etc. at one point of the integrated transmission line (10A) from propagating throughout the entire integrated transmission line (10A), thereby suppressing such damage to the minimum.

In a second aspect of the present invention, the switching hub (31) is a three-port switching hub for connecting the integrated transmission line (10A) between the air conditioning units (20, 20) to have a spanning three.

In the second aspect, the integrated transmission line (10A) between the air conditioning units (20, 20) is connected by the three-port switching hub (31) to have a spanning three. Accordingly, when the bypass transmission line (10C) is connected to the inlet port and the outlet port in the network of the daisy-chain-connected outdoor units (30), the bypass transmission line (10C) can be used for communication upon occurrence of communication abnormality in the original communication path, that is, the integrated transmission line (10A). In other words, even when a failure occurs in a unit or a transmission wire in middle of the daisy chain connection of a plurality of units, the units posterior thereto can be prevented from being out of centralized supervisory and control.

In a third aspect of the present invention, the transmission relay means (25) includes an insulation transformer (35) for common mode noise reduction.

In the third aspect, the insulation transformer (35) provided at the transmission relay means (25) reduces the common mode noise to minimize the influence of the induction noise caused in the other power wires and communication wires.

In a fourth aspect of the present invention, the integrated transmission line (10A) is formed of a transmission wire including a mis-wiring protection connector.

In the fourth aspect, the integrated transmission line (10A) is formed with the transmission wire including the mis-wiring protection connector. With the use of the transmission wire including the standardized mis-wiring protection connector for the integrated transmission line (10A), the transmission wire is connected to a standardized cable to prevent a disparate wire from being used and to prevent the power supply wire from being connected thereto, thereby improving the quality of the transmission path. Namely, transmission wire can be connected to a connector having a structure which prevents reverse insertion, which has a locking function of preventing dislocation, and which hardly allows the contact contacting part to be in direct contact with the outside air in inserting the connector.

In a fifth aspect of the present invention, the integrated transmission line (10A) is composed of a CSMA/CD LAN. Namely, the integrated transmission line (10A) is composed of an Ethernet (registered trademark) transmission line.

In the fifth aspect, the integrated transmission line (10A) is composed of an Ethernet transmission line. This accordingly enables, in addition to communication of a control signal for controlling the outdoor units (30) and the indoor units (40), remote and quick malfunction diagnosis, remote acquisition of an operation log in a unit, and high-speed update of control software by sending further intimate information in the units in high-speed communication.

Advantages of the Invention

In the present invention, the integrated transmission line (10A) and the internal/external transmission lines (10B) are connected to each other separably, which is advantageous in preventing generation of the negative reflected wave and occurrence of communication abnormality caused due variation in characteristic impedance. Daisy chain connection of the integrated transmission line (10A) can suppress to the minimum damage by communication abnormality occurring at one point in the transmission lines to the entire system while securing wiring easiness of the conventional bus line.

Specifically, the outdoor units (30), which are generally installed on a roof floor of a building, may get struck by lighting. For example, when the outdoor units (30, 30) are connected to each other through a bus line, a lighting striking at one point of the integrated transmission line (10A) may break the control boards (33) of all of the bus-connected outdoor units (30). In contrast, the daisy chain connection between the outdoor units (30, 30) prevents influence of a failure, such as short-circuit, ground fault, etc. at one point of the integrated transmission line (10A) from propagating throughout the entire integrated transmission line (10A), thereby suppressing such damage to the minimum.

According to the second aspect of the present invention, when the bypass transmission line (10C) is connected to the inlet port and the outlet port of the network of the daisy-chain-connected outdoor units (30), the bypass transmission line (10C) can be used for communication upon occurrence of communication abnormality in the original communication path, that is, the integrated transmission line (10A). In other words, even when a failure occurs in a unit or a transmission wire in middle of the daisy chain connection of a plurality of units, the units posterior thereto can be prevented from being out of centralized supervisory and control.

In the third aspect of the present invention, the insulation transformer (35, 35) is provided in each outdoor unit (30). This reduces the common mode noise, and reduces the influence of the induction noise in the other power wires and communication wires to the minimum.

In the fourth aspect of the present invention, the transmission wire including the standardized mis-wiring protection connector is used for the integrated transmission line (10A). Accordingly, the transmission wire is connected to a standardized cable to prevent a disparate wire from being used and to prevent the power supply wire from being connected thereto, thereby improving the quality of the transmission path. Namely, the transmission wire can be connected to a connector having a structure which prevents reverse insertion, which has a locking function of preventing dislocation, and which hardly allows the contact contacting part to be in direct contact with the outside air in inserting the connector.

The fifth aspect of the present invention accordingly enables, in addition to communication of a control signal for controlling the outdoor units (30) and the indoor units (40), remote and quick malfunction diagnosis, remote acquisition of an operation log in a unit, and high-speed update of control software by sending further intimate information inside the units in high-speed communication.

INDEX OF REFERENCE NUMERALS 10 transmission system
10A integrated transmission line
10B internal/external transmission line
10C bypass transmission line
20 air conditioning unit
25 transmission relay means
30 outdoor unit
31 switching hub
32 gateway
33 control board
35 insulation transformer
40 indoor unit
60 centralized control unit

BEST MODE FOR CARRYING OUT THE INVENTION

Embodiments of the present invention will be described in detail below with reference to the accompanying drawings. The following preferred embodiments describes mere essential examples and are not intended to limit the scopes of the present invention, applicable subjects, and use.

Embodiment 1

Figure 1:
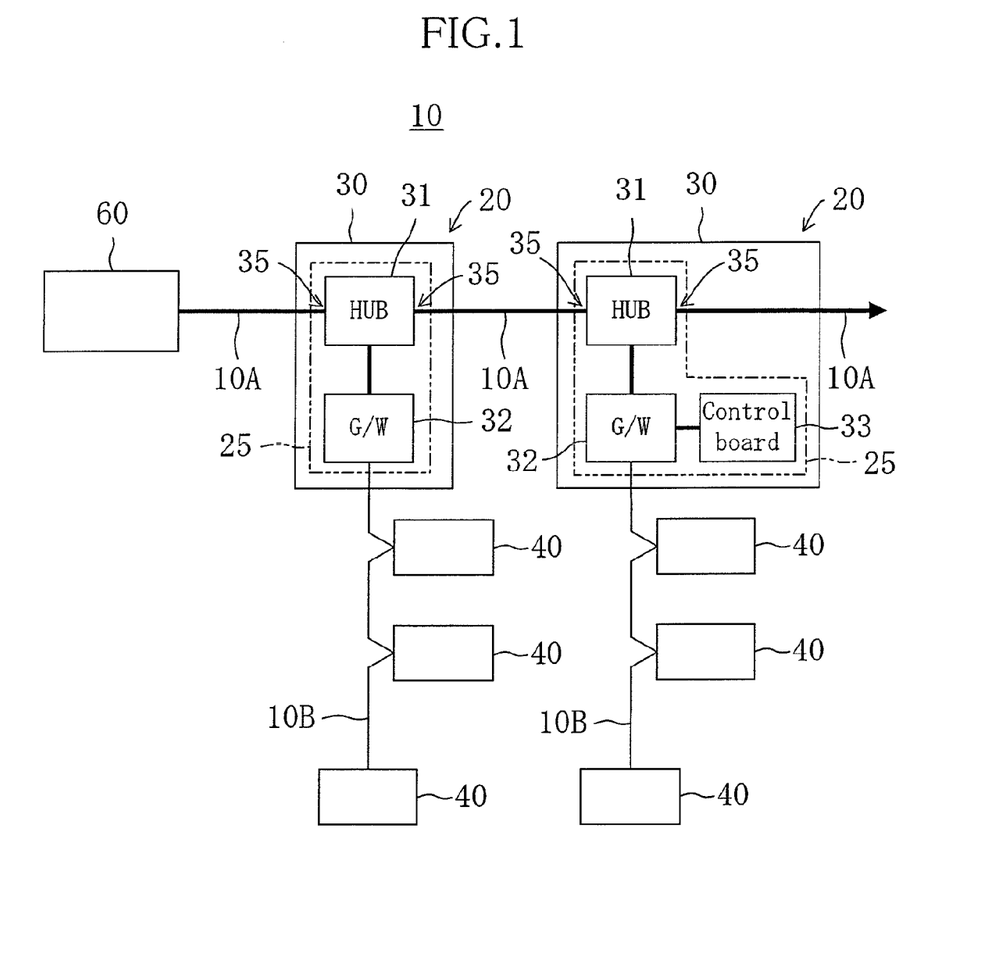
FIG. 1 is a schematic diagram showing a construction of a transmission system for an air conditioner in accordance with Embodiment 1 of the present invention.

FIG. 1 is a schematic diagram showing a construction of a transmission system for an air conditioner in accordance with Embodiment 1 of the present invention. As shown in FIG. 1, a transmission system (10) for an air conditioner includes two air conditioning units (20, 20), in each of which three indoor units (40, 40, 40) are connected in parallel to one outdoor unit (30) through a refrigerant pipe.

Though not shown, each outdoor unit (30) includes at least a compressor, a four-way switching valve, an outdoor heat exchanger including a fan, and a motor-operated outdoor expansion valve while each indoor unit (40, 40, 40) includes at least a motor-operated indoor expansion valve and an indoor heat exchanger including a fan. A refrigerant circuit in which refrigerant circulates is so composed that the direction in which the refrigerant circulates is reversible between the cooling operation mode and the heating operation mode.

Each air conditioning unit (20, 20) composes one control group in which the associated outdoor unit (30) and the associated indoor units (40, 40, 40) are connected to each other through one internal/external transmission line (10B) so as to be capable of data transmission.

The integrated transmission line (10A) and each internal/external transmission line (10B) are connected to each other by transmission relay means (25), specifically, by a switching hub (31) and a gateway (32) provided in each outdoor unit (30) so that the integrated transmission line (10A) and the respective internal/external transmission lines (10B) form transmission lines. Whereby, the integrated transmission line (10A) and each internal/external transmission line (10B) are connected to each other separably, which is advantages in preventing generation of the negative reflected wave and occurrence of communication abnormality caused due to variation in characteristic impedance.

For data transmission through these transmission lines, namely, data transmission among a centralized control unit (60), the outdoor units (30), and the indoor units (40, 40, . . . ), a balanced communication system of an AMI (Alternate Mark Inversion) communication) communication method is employed to perform half-duplex data transmission with a predetermined polarity. Each of the integrated transmission line (10A) and the internal/external transmission lines (10B) of the transmission lines is composed of positive and negative two signal wires.

To each indoor unit (40, 40, 40) in the air conditioning units (20, 20), one remote controller is connected through a remote control line, though not shown in FIG. 1, so that inputs of ON/OFF operation, temperature setting, and the like of the indoor units (40, 40, 40) can be done through the remote controllers.

The integrated transmission line (10A) is connected to each outdoor unit (30) of the air conditioning units (20, 20) while the centralized control unit (60) is connected to the integrated transmission line (10A). The centralized control unit (60) receives inputs of ON/Off operation, temperature setting, and the like of each indoor unit (40, 40, . . . ) to control concentrically all the outdoor units (30, 30) and all the indoor units (40, 40, . . . ).

Each of the outdoor units (30) includes the switching hub (31) and the gateway (32) of the transmission relay means (25). The switching hub (31) is used for daisy-chain connecting the integrated transmission line (10A) between the air conditioning units (20, 20), and includes a plurality of connection ports.

While the number of the outdoor units (30) installed in, for example, a large building amounts to several hundreds, the number of connectable air conditioners is limited to 128 at the present time according to the transmission speed and traffic. There are several hundreds to several thousands of indoor units (40, 40, . . . ) in an actual building, and accordingly, a severe problem is involved in increasing the number of to-be-connected indoor units under the present circumstances.

Figure 2:
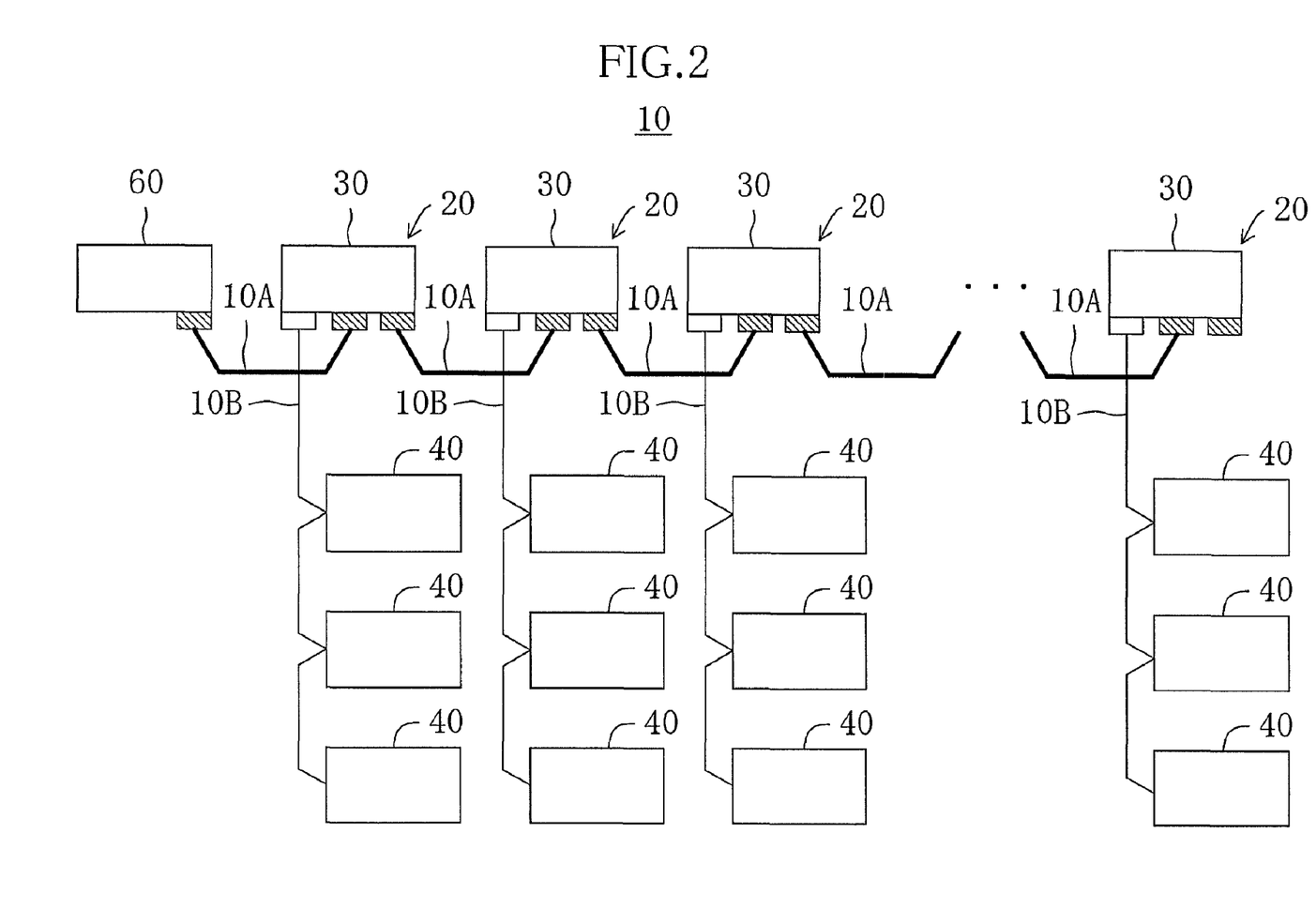
FIG. 2 is a schematic diagram showing a state where the number of connected air conditioning units is increased.

To tackle this problem, Embodiment 1 uses the switching hub (31) for relaying the integrated transmission line (10A) in order to daisy-chain connect the outdoor units (30, 30) of each air conditioning unit (20, 20). As a result, the number of connectable indoor units (40, 40, . . . ) to the centralized control unit (60) increases when compared with the conventional one, thereby achieving large-scale air conditioning (see FIG. 2).

The gateway (32) performs conversion of the data and the waveform between different protocols for absorbing difference in transmission scheme to enable communication, and allows data transmission between the integrated transmission line (10A) and the internal/external transmission lines (10B) to be separable. In other words, the gateway (32) controls each of communication from the associated switching hub (31), communication from the associated indoor units (40), and communication from an associated control board (33). This enables interruption of electric interference on the associated two transmission lines.

The switching hub (31) includes two ports relaying the integrated transmission line (10A), at which the insulation transformers (35, 35) are provided for reducing the common mode noise.

Figure 3:
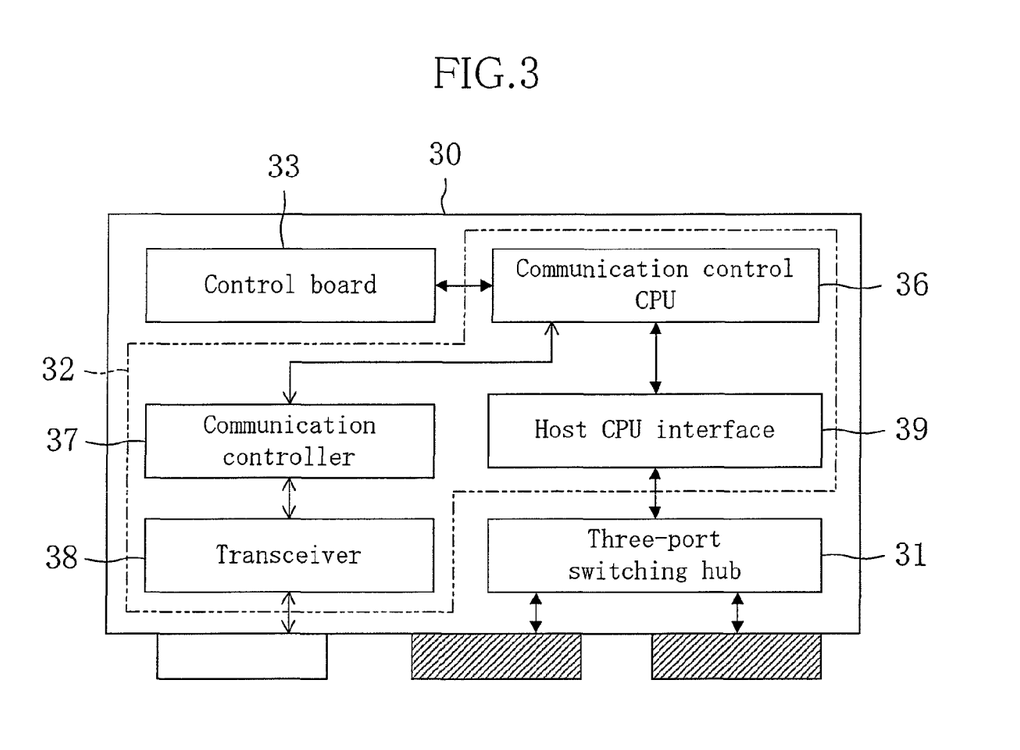
FIG. 3 is a schematic diagram showing an internal structure of a gateway provided in an outdoor unit.
Figure 4:
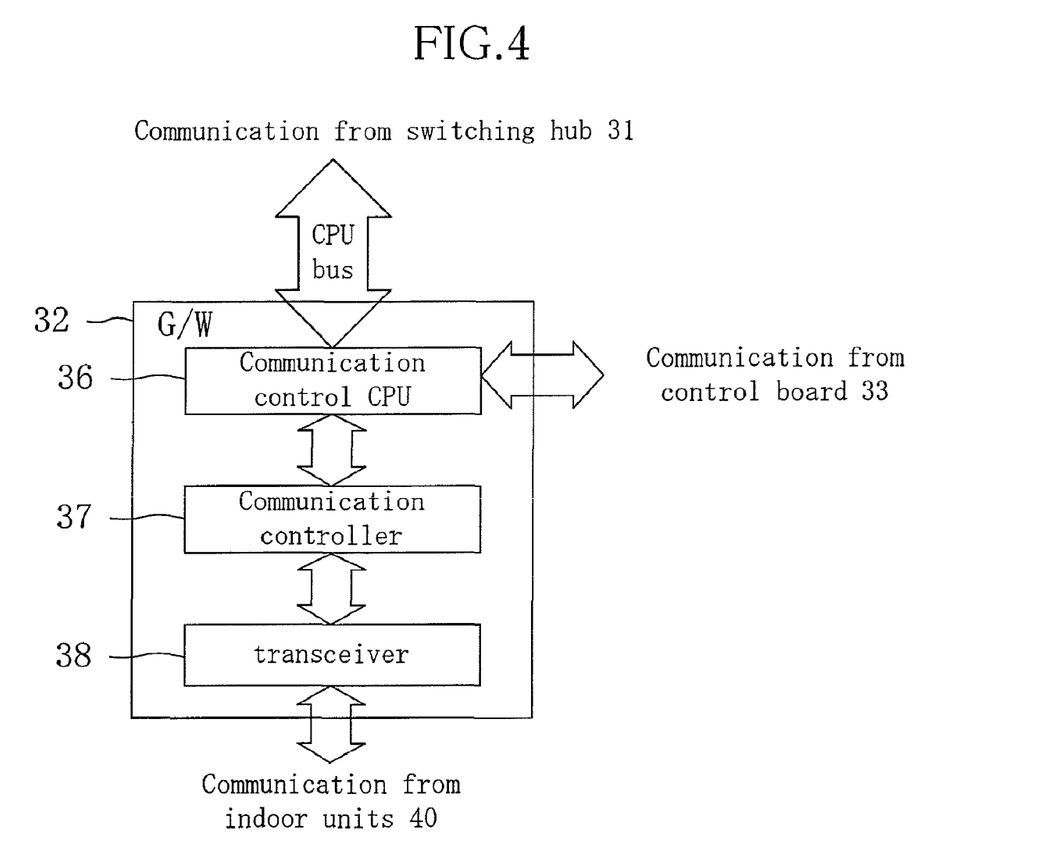
FIG. 4 is a schematic diagram showing communication control in the gateway.

FIG. 3 is a schematic diagram showing an internal structure of the gateway (32) provided in each outdoor unit (30), and FIG. 4 is a schematic diagram showing communication control in the gateway (32).

As shown in FIG. 3 and FIG. 4, the gateway (32) includes a communication control CPU (36), a communication controller (37), a transceiver (38), and a host CPU interface (39).

The communication control CPU (36) controls each of communication from the associated switching hub (31), communication from the associated control board (33), and communication from each of the associated indoor units (40). The communication controller (37) and the transceiver (38) are provided between the associated indoor unit (40) and the communication control CPU (36) for sending/receiving a control signal.

Intervention of the gateways (32) between the integrated transmission line (10A) and the respective internal/external transmission lines (10B) can increase the transmission speed of the integrated transmission line (10A) more than that of the internal/external transmission lines (10B). In other words, the number of connectable indoor units (40) increases.

As described above, in Embodiment 1, the integrated transmission line (10A) between the air conditioning units (20, 20) is daisy-chain connected, and the insulation transformers (35, 35) are provided in each outdoor unit (30). This minimizes damage of foreign surge.

Specifically, the outdoor units (30), which are generally installed on a roof floor of a building, may get struck by lighting. For example, when the outdoor units (30, 30) are connected to each other through a bus line, a lighting striking at one point of the integrated transmission line (10A) may break the control boards (33) of all of the bus-connected outdoor units (30). In contrast, the daisy chain connection between the outdoor units (30, 30) prevents influence of a failure, such as short-circuit, ground fault, etc. at one point of the integrated transmission line (10A) from propagating throughout the entire integrated transmission line (10A), thereby suppressing such damage to the minimum. Hence, the reliability against communication abnormality can be enhanced.

For example, in the case where ten outdoor units (30) are bus-connected, when a failure occurs in the integrated transmission line (10A) between the fifth and sixth outdoor units counting from one on the side connected to the centralized control unit (60), it becomes difficult to control the entire system. In contrast, in the case of daisy chain connection, the control on first to fifth outdoor units can be maintained.

In Embodiment 1, a transmission wire including a standardized mis-wiring protection connector is used for the integrated transmission line (10A). Connection of the transmission wire to a standardized cable can alleviate problems of, for example, mis-connection of a transmission wire of a different kind and mis-connection of a power supply line to break a control board, thereby remarkably improving the quality of the transmission path. Specifically, it is preferable to connect the transmission wire to a connector having a structure which prevents reverse insertion, which has a locking function of preventing dislocation, and which hardly invites direct contact of the contact contacting part with the outside air in inserting the connector.

In the transmission system (10) for an air conditioner in accordance with Embodiment 1, the integrated transmission line (10A) is composed of an Ethernet (registered trademark) transmission line. Specifically, the outdoor units (30, 30) and the centralized control unit (60) for a multi-air conditioner in a building are connected to each other by 10BASE-T, 100BASE-TX, or 1000BASE-T Ethernet as a CSMA/CD LAN.

At present, in order to put a plurality of air conditioning units (20) under centralized administration, the outdoor units (30, 30) are connected to each other through communication therebetween by employing a unique communication scheme. This involves limits on the maximum number of connectable units and communication speed, and a problem in connection to a general LAN, which serve as bars to future system development. To tackle these problems, the outdoor units (30, 30) are connected to each other through the currently developing Ethernet (registered trademark) to support a large-scale air conditioning system.

Ethernet is the most popular network in offices and home, and is being improved in performance and cost performance day by day, and therefore, merits that can be enjoy its high-speed transmission performance and connection to an open network might be significant.

Ethernet used for allowing the outdoor units (30, 30) to be connected to each other in extended connection (in daisy chain connection) is 10BASE-T, 100BASE-TX, or 1000BASE-TX using UTP (Unshielded Twist pair cable), which are in a star-shaped wiring configuration topology of which the center is the switching hub (31). In order to realize daisy chain connection, the switching hub (31) including the three ports is provided in each outdoor unit (30, 30), of which two ports are used for connecting outdoor units (30, 30) while the other port is used for communication with the communication control CPU (36) in each outdoor unit (30) (see FIG. 3).

With the above arrangement, the outdoor units (30, 30) are connected to each other by the uplink switching hub (31). The conventional uplink connection necessitates a cross cable. The cross cable has terminals to be connected to connectors which are reverse to each other, thereby inviting mis-connection. To tackle this problem, "Auto MDI/MID-X" function, which is a function of automatically switching sending/receiving at a port by automatically discriminating the kind of a connected cable, is provided to the ports of the switching hub (31). This can leads to an advantageous effect of facilitating operation for connection.

In the case where various units different in communication speed (10BASE-T: 10 Mbit/sec, 100BASE-T: 100 Mbit/sec, and 1000BASE-T: 1000 Mbit/sec) are connected to the switching hub (31) provided in an outdoor unit (30), setting of these units is much laborious and may cause mis-setting. To tackle this problem, an auto-negotiation function, which is a function of selecting an optimum state allowing the switching hub (31) to comply by self-discriminating of the communication ability of a connected paired member, is provided to the switching hub (31), Ethernet (registered trademark) connection to a general notebook computer leads to facilitation of individual setting thereof.

As described above, in the transmission system (10) for an air conditioner in accordance with Embodiment 1, the integrated transmission line (10A) and the internal/external transmission lines (10B) are connected to each other separably, which is advantageous in preventing generation of the negative reflected wave and occurrence of communication abnormality caused due to variation in characteristic impedance.

Daisy chain connection of the integrated transmission line (10A) secures wiring easiness of the conventional bus line while suppressing to the minimum damage by communication abnormality occurring at one point in the transmission lines to the entire system.

The integrated transmission line (10A) is composed of an Ethernet transmission line. This accordingly enables, in addition to communication of a control signal for controlling the outdoor units and the indoor units, remote and quick malfunction diagnosis by sending further intimate information, for example, an operation log and the like in the units in high-speed communication. In addition, in the case where the system is put under a special condition to be hardly supported by incorporated control software, connection to an existing LAN may eliminate the need for engaging works for remote control, for short-time and remote rewrite of control software of the control CPU for optimizing the control software for energy saving and the like, and for centralized administration over a plurality of buildings.

Embodiment 2

Figure 5:
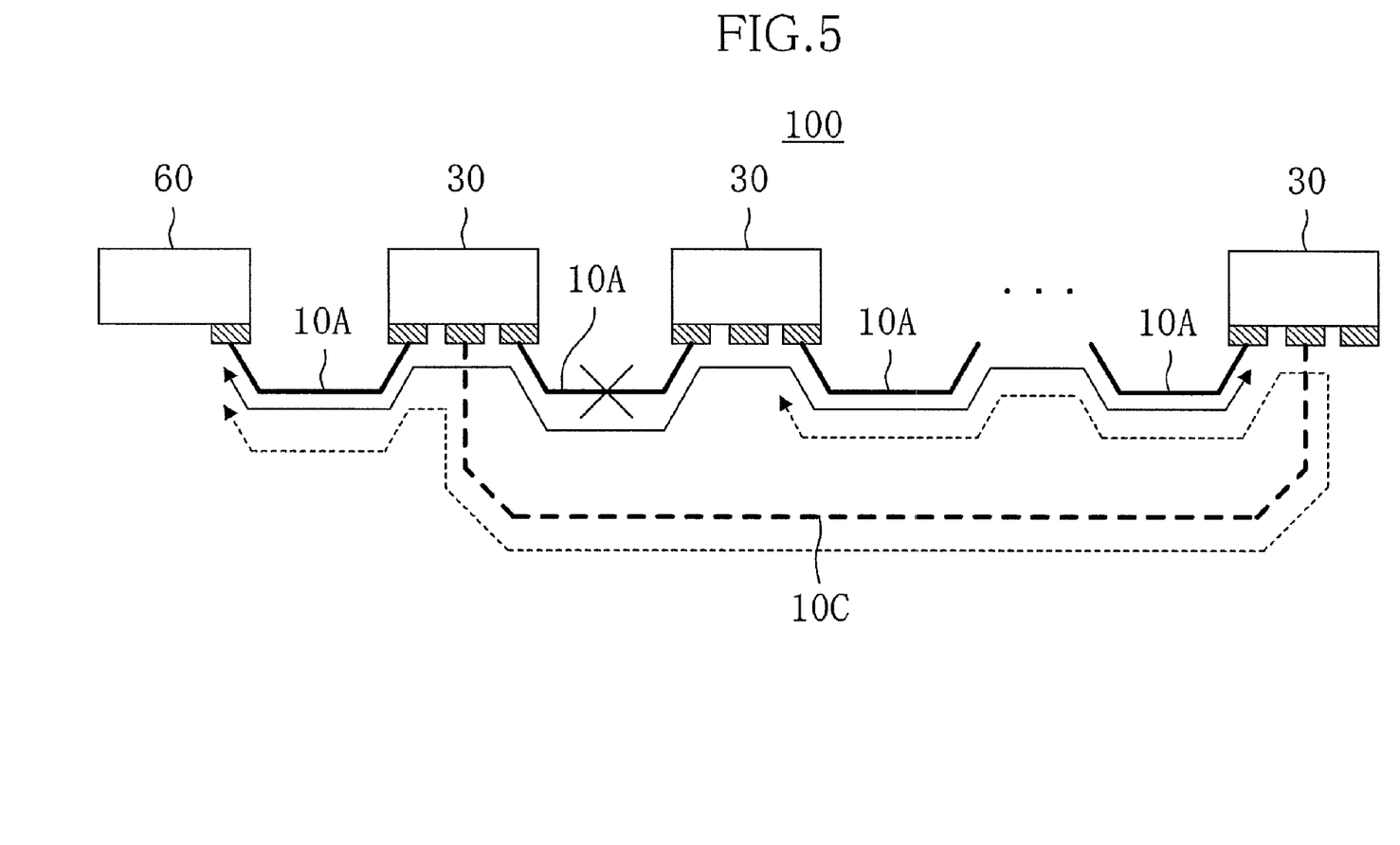
FIG. 5 is a schematic diagram showing a construction of a transmission system for an air conditioner in accordance with Embodiment 2 of the present invention.

FIG. 5 is a schematic diagram showing a construction of a transmission system for an air conditioner in accordance with Embodiment 2 of the present invention. The difference from Embodiment 1 lies only in that the integrated transmission line (10A) is connected to have a spanning tree, and therefore, the same reference numerals are assigned to the same elements as those in Embodiment 1 for describing only the difference.

FIG. 5 shows a state where a plurality of outdoor units (30, 30, ...) are connected to each other by the three-port switching hubs (31) to have a spanning tree. Although only two ports suffice for each switching hub (31) in the outdoor units (30) for the usual unit operation, an additional third port is provided for maintenance or for an adaptor for LAN connection to units in Embodiment 2. FIG. 5 includes no port for the host CPU and omits the indoor units (40).

As shown in FIG. 5, in a transmission system (100), the centralized control unit (60) and a plurality of outdoor units (30, 30, ...) are daisy-chain connected to each other through the integrated transmission line (10A), and the spare port of a first outdoor unit (30) and the spare port of the last outdoor unit (30), each outdoor unit counting from one on the side of the centralized control unit (60), are connected to each other through a bypass transmission line (10C). Whereby, one transmission line is formed in which the integrated transmission line (10A) and the bypass transmission line (10C) are connected to each other in a panning three form.

For interchanging, between the centralized control unit (60) and each air conditioning unit (20, 20, ...), a control signal indicating various kinds of data, such as an operation command, a stop command, a temperature setting command, and the like output from the centralized control unit (60) in normal operation, only the integrated transmission line (10) is used rather than the bypass transmission line (10C).

Upon occurrence of short-circuit (indicated by X in FIG. 5) in the integrated transmission line (10) between, for example, the first outdoor unit (30) and the second outdoor unit (30), the bypass transmission line (10C) is used to transmit therethrough the control signal from the first outdoor unit (30) to the last outdoor unit (30). Subsequently, the control signal is transmitted to the outdoor unit (30) one-stage anterior to the last outdoor unit (30) and then to the outdoor units (30) further anterior thereto to propagate the control signal.

As described above, in the transmission system (100) in accordance with Embodiment 2, the integrated transmission line (10A) is connected to have a spanning tree, so that the control signal can be transmitted through the bypass transmission line (10C) upon breakage in middle of the integrated transmission line (10A).

In other words, daisy chain connection of the plurality of air conditioning units (20, 20, ...) may invite, when a failure occurs in a part of the integrated transmission line (10A) or an air conditioning unit (20) in middle of the transmission path, a state in which the air conditioning units (20) posterior thereto may not be set under centralized supervisory and control. In contrast, the transmission system (100) of Embodiment 2 can avoid this problem to enhance the reliability against transmission abnormality.

INDUSTRIAL APPLICABILITY

As described above, the present invention can obtain highly practical effects of suppressing to the minimum influence by communication abnormality occurring in a part of a transmission line to the entire system, and is therefore useful, and exhibits excellent industrial applicability.

The invention claimed is:

1. A transmission system for an air conditioner, comprising:
    a plurality of air conditioning units each including an outdoor unit and a plurality of indoor units, the outdoor unit and the plurality of indoor units being connected to each other through an internal/external transmission line for data transmission; and
    an integrated transmission line connecting a centralized control unit and the plurality of air conditioning units to each other for data transmission, the centralized control unit providing centralized control on the plurality of air conditioning units, wherein
    each internal/external transmission line and the integrated transmission line are connected to the outdoor unit, and are connected to each other by a transmission relay provided in the outdoor unit for separating data transmission between the internal/external transmission line and the integrated transmission line,
    the transmission relay includes: a switching hub for daisy-chain connecting the plurality of air conditioning units through the integrated transmission line; and a gateway connected to the switching hub and the internal/external transmission line, the gateway separately controlling data transmission on the internal/external transmission line and data transmission on the integrated transmission line,
    the outdoor units of the plurality of air condition units are sequentially connected to each other by the transmission relay provided in each of the outdoor units to sequentially transmit data between the outdoor units through the respective transmission relays,
    the switching hub includes a first port connecting to the gateway, a second port connecting to the integrated transmission line, and a third port connecting to the integrated transmission line or being opened, and
    the gateway is connected to a control board of each of the outdoor units.

2. The transmission system of claim 1,
    wherein the switching hub is a three-port switching hub for connecting the plurality of air conditioning units through the integrated transmission line to have a spanning tree.

3. The transmission system of claim 1,
    wherein the transmission relay includes an insulation transformer for common mode noise reduction.

4. The transmission system of claim 1,
    wherein the integrated transmission line is formed of a transmission wire including a mis-wiring protection connector.

5. The transmission system of claim 1,
    wherein the integrated transmission line is composed of a CSMA/CD LAN.

6. The transmission system of claim 1,
    wherein the outdoor unit includes the transmission relay.

7. The transmission system of claim 1,
    wherein the integrated transmission line connects to the gateway via the switching hub and the each internal/external transmission line connects to the gateway without passing through the switching hub.

* * * * *